United States Patent [19]

Finney

[11] 3,993,793

[45] Nov. 23, 1976

[54] SOFT ICE CREAM

[75] Inventor: David John Finney, Palmerston North, New Zealand

[73] Assignee: Thomas J. Lipton, Inc., Englewood Cliffs, N.J.

[22] Filed: June 9, 1975

[21] Appl. No.: 585,404

[52] U.S. Cl. .................................. 426/565; 426/654

[51] Int. Cl.[2] .................................. A23G 9/02

[58] Field of Search ..................... 426/565, 566, 654

[56] References Cited

UNITED STATES PATENTS

| | | | |
|---|---|---|---|
| 2,856,289 | 10/1958 | Weinstein | 426/654 |
| 3,539,365 | 11/1970 | Durand et al. | 260/212 |
| 3,576,648 | 4/1971 | Goodman et al. | 426/565 |
| 3,845,223 | 10/1974 | Moneymaker | 426/654 |

OTHER PUBLICATIONS

Avicel RC-591 in Foods, Bulletin No. RC-22, May 1971, FMC Corporation, Marcus Hook, Pa., 35 pages.

*Primary Examiner*—Jeanette M. Hunter
*Attorney, Agent, or Firm*—Brumbaugh, Graves, Donohue & Raymond

[57] ABSTRACT

A stabilizer system has been developed that is particularly useful in ice cream requiring more than usual stabilization. The system comprises microcrystalline cellulose with one or more of carboxymethyl cellulose and a galactomannan gum. A preferred system consists of microcrystalline cellulose, carboxymethyl cellulose and locust bean gum or tara gum.

4 Claims, No Drawings

SOFT ICE CREAM

The invention relates to ice cream and to a stabiliser system for use, for instance, in ice cream.

The way in which ice cream behaves on exposure to normal room temperature is important for the consumer. If a product behaves too atypically, for instance if a product melts too rapidly or separates into a fatty phase and a clear aqueous phase on melting, then the product will be unacceptable. In the ice cream industry methods have been developed for measuring such properties, for instance melt-down and stand-up. These are described later.

It is known that such properties can be affected by the use of stabilisers, often called thickeners. A problem that arises is that the stabilisers deleteriously affect the feel of the ice cream in the mouth; a cloying, gummy or even greasy feel can occur. This problem is acute in ice creams that require more than usual stabilisation. What is desired is a stabiliser system that is good or at least adequate with respect to all aspects of stability. This is difficult to achieve for normal ice creams and particularly so for ice creams that require more than usual stabilisation.

A stabiliser system has now been found that is surprisingly effective in stabilising ice cream without giving an unacceptable mouth-feel. The stabilizer system is microcrystalline cellulose in combination with one or more of carboxymethylcellulose and galactomannan gums. Preferably the stabiliser system consists of microcrystalline cellulose, carboxymethylcellulose and a galactomannan gum. Examples of galactomannan gums are guar gum, locust bean gum and tara gum.

The invention therefore provides an ice cream containing a stabilising amount of microcrystalline cellulose and one or more of carboxymethylcellulose and galactomannan gums. A galactomannan gum is preferably present.

The amount of microcrystalline cellulose is preferably at least 0.01%, particularly preferably at least 0.1%. Preferably not more than 0.8% will be used, particularly preferably not more than 0.4% cost is a factor. A preferred range is 0.15 to 0.4%, particularly to 0.25%. The amount of total carboxymethyl-cellulose (calculated as sodium carboxymethylcellulose) and galactomannan gums is preferably not more than 1%, particularly preferably not more than 0.5% and preferably is in the range 0.15 to 0.25%. The lower limit for carboxymethylcellulose is preferably 0.01%. The lower limit for galactomannan gums, in particular for locust bean gum, is preferably 0.05%. Of course not more than one component should be at or near their lower limits, in any one stabiliser system.

The weight ratio of microcrystalline cellulose to total carboxymethylcellulose (calculated as sodium carboxymethylcellulose) and galactomannan gums is preferably in the range 4:1 to 1:4, particularly preferably in the range 2:1 to 1:3. Total stabiliser is preferably in the range 0.15 to 1.0% particularly preferably 0.30 to 0.5%. The weight ratio of microcrystalline cellulose to carboxymethylcellulose is preferably not more than 3:1 and preferably is not less than 1:2.

As emphasised above the stabiliser system is particularly useful in ice creams that require more than usual stabilisation.

A problem with conventional ice creams is that at deep freeze temperatures, eg. −20° C, they cannot be served or eaten as readily as when they are at normal eating temperatures, eg. −10° C. The consumer cannot treat them even approximately in the normal manner immediately when taken from the deep freeze. In some cases conventional ice creams cannot even be scooped out with a spoon at −20° C, i.e. are not spoonable. Reformulation to ensure that such properties, eg. spoonability at deep freeze temperatures are approximately those expected at normal eating temperatures is comparatively simple. Methods are outlined later. The difficulty is that such reformulation leads to products that do not have acceptable properties, in particular stability, at normal eating temperatures. It has seemed impossible to get an ice cream that has at both deep freeze and normal eating temperatures even approximately the serving and eating properties conventionally expected at normal eating temperatures and that is sufficiently stable. The present invention provides a stabiliser system with which this can be achieved.

It will be appreciated that the product-characteristics required for a conventional ice cream will depend on the personal tastes of the consumer and ice creams are formulated to meet a variety of such tastes; the formulation of any one conventional ice cream will depend on the tastes of the consumers concerned. In this context a conventional ice cream is one prepared by a process involving freezing and hardening to temperatures in the order of −20° C to −40° C. One important characteristic of ice cream particularly in relation to scoopability is the log C, as defined later, of the ice cream. In the UK for instance, an ice cream can normally only be called a conventional ice cream if its log C at −20° C after hardening is in the range 2.9 to 3.7; usually the log C of a UK non-dairy ice cream at −20° C after hardening will be in the range 3.3 to 3.7; for a dairy ice cream the range is 2.9 to 3.3. In other countries values for log C will be comparable but can be different, often higher, and indeed even within a country various conventional ice creams will vary in their log C values. (A technique for measuring C, the penetrometer value, and hence log C is described later in the specification).

Whatever the conventional ice cream used, its properties at deep-freeze temperatures can be approximated to those expected at normal eating temperature by adding freezing-point depressants such as monosaccharides and low molecular-weight alcohols, preferably polyalcohols and in particular glycerol and sorbitol. It has been found that normally sufficient of such freezing-point depressants should be added to the formulation of a conventional ice cream, eg. at expense of water, to lower the log C at −20° C by between 0.25 and 1, preferably by 0.4 to 0.75. The notional replacement, eg. of freezing-point depressant for sugar/water, should be such that the product has the desired (by the consumer) sweetness as well as the desired log C, or spoonability, at −20° C.

As indicated above, a problem facing ice cream manufacturers is that in general ice creams formulated to have the conventional eating temperature properties at −20° C, in particular to be spoonable at −20° C, have unacceptably poor properties, eg. stand-up and melt-down, at normal eating temperatures. For the ice cream to be spoonable at −20° C it has been found that its log C should preferably be less than 2.8, particularly preferably less than 2.5; a correlation has been found to exist between spoonability and log C.

An especially important aspect of the present invention is an improvement in an ice cream whose log C (C being its penetrometer value) at −20° C has been lowered by between 0.25 and 1 by use of freezing-point depressants, the improvement consisting of the use of the stabiliser system of the present invention.

Microcrystalline cellulose is a well-known industrial product. Its use at comparatively high levels in low calorie products, including low-calorie ice creams, is described in British Pat. specification No. 961,398. Processes for its preparation are well-known and are for instance described in U.S. Pat. No. 3,157,518, which is incorporated by reference. One problem with microcrystalline cellulose is its dispersability. Methods for overcoming this are well-known; a particular technique involves the use of carboxymethylcellulose. Microcrystalline cellulose is sold under the trade name Avicel by FMC Corporation and a readily dispersible form containing sodium carboxymethylcellulose is sold as Avicel RC-591. It is stated to be a colloidal form of microcrystalline cellulose which has been blended with sodium carboxymethylcellulose and dried. The amount of sodium carboxymethylcellulose is 11% ± 1%, by weight of microcrystalline cellulose. Microcrystalline cellulose is fully characterised in for instance British Pat. No. 961,398 and U.S. Pat. No. 3,157,518 but briefly can be stated to be cellulose crystallite aggregates with a level-off D.P. Level-off DP is the average level-off degree of polymerisation measured in accordance with the paper by O. A. Battista entitled "Hydrolysis and Crystallisation of Cellulose" Vol. 42 (1950), Industrial and Engineering Chemistry, pages 502 to 507. As stated in British Pat. No. 961,398 suitable microcrystalline celluloses have average level-off DP's in the range 125 to 375, particularly 200 to 300; the particle size of the aggregates of microcrystalline cellulose will usually be in the range 1 to 300 microns.

Galactomannan gums are well-known materials and are described for instance by M. Glickman in "Gum Technology in the Food Industry", Academic Press, 1969. Preferred galactomannan gums for use in the invention are locust bean gum and tara gum. carboxymethylcelluloses are standard industrial products.

In this specification, including the claims, percentages are by weight and in particular are by weight of ice cream except where the context requires otherwise.

Other than in the use of sufficient freezing point depressant for the preferred aspect of the invention and in the use of a thickening agent comprising particular components no especial insight is required in the formulation or processing of ice creams according to the invention. Details of conventional formulations and processing conditions for ice cream can be found in the usual trade publications and text books. Particularly useful in this respect is Arbuckle, "Ice Cream", 1972 (2nd Edition), AVI Publishing Corp., Westpoint, Conn.

The invention will now be illustrated further by the following examples.

The properties of the stabiliser system are most surprising when compared with the properties of the separate components. This is illustrated in the examples but it will be appreciated that the stabiliser system is also useful in products other than ice cream.

EXAMPLE 1

An ice cream was prepared by conventional processing techniques to the following formulation:

| | Ingredient | % by weight |
|---|---|---|
| Made-up skimmed milk (32.5% solids) | | 27 |
| | Sucrose | 13 |
| | Glucose syrup | 2 |
| | Liquid oil blend | 9.5 |
| | Monoglyceride emulsifier | 0.45 |
| | Colour and flavour | 0.03 |
| Thickening agents | Locust bean gum | 0.15 |
| | Avicel RC 591** | 0.2 |
| | Sodium carboxymethyl cellulose* | 0.15 |
| | Salt | 0.05 |
| | Glycerol | 3.0 |
| | Water to | 100 |

*Supplied by ICI as powder B600
**Supplied by FMC and believed to contain by weight 11% sodium carboxymethyl cellulose.

The presence of the thickening agents can be detected analytically in such a product. The product itself is an excellent ice cream resembling conventional UK ice cream in eating properties but being spoonable at −20° C.

EXAMPLE 2

An ice cream mix was prepared from the following ingredients, in parts by weight:

| | |
|---|---|
| Palm oil | 5.5 |
| Stearic monoglyceride | 0.15 |
| Spray-dried milk powder | 10.0 |
| Sucrose | 14.0 |
| Microcrystalline cellulose (containing 11% of sodium carboxymethylcellulose) | 0.4 |
| Sodium carboxymethylcellulose* | 0.2 |
| Locust bean gum | 0.22 |
| Trisodium citrate | 0.3 |
| Water | 64 |

*Supplied by ICI as powder B600

The stearic monoglyceride was dispersed in the palm oil to give a fat phase. The milk powder was dispersed in the water and to the dispersion was added the remaining ingredients, giving an aqueous phase. The fat and aqueous phase at 65° were mixed, homogenised at a pressure of 2000 psi and the emulsion formed was pasteurised at 70° for 20 minutes and cooled at 5° at which it had pH 6.5. After ageing for 2 hours at 5° C 6 parts of a concentrated orange juice, 0.04 parts of colouring agent, and 3 parts of a 33% by weight aqueous solution of citric acid were mixed with the emulsion. The resulting emulsion of pH 3.5 was converted to an ice cream by cooling and whipping at −4°, and the ice cream was blast frozen to −20° and stored.

This example shows the use of the stabiliser system in stabilising an acid ice cream, a type of ice cream that requires more stabilisation than an average ice cream.

The stabiliser system is particularly useful in an acid ice cream, i.e. an ice cream with a pH in the range 3.0 to 5.2. The pH should, as well as being within this range, preferably be sufficiently below the isoelectric point of any acid-precipitable protein present in substantial amount for that protein to be present substantially uncoagulated. Alternatively whey protein preferably purified by reverse osmosis, can be used; whey protein is not acid-precipitable. Such ice creams are described and claimed in our co-pending U.K. patent application No. 57493/72 corresponding to German Pat. No. 2361658 and U.S. Ser. No. 422,617 filed in Dec. 7th, 1973.

EXAMPLES 3 TO 14 AND COMPARISONS A TO F

Ice cream mixes were prepared conventionally to the following formulation. Further details are given in Table 1 immediately before claims which also shows results obtained with ice cream prepared conventionally from the mixtures. A standard UK non-dairy ice cream differs from this formulation in containing no glycerol and 1.4% by weight more sugar. 3% glycerol is roughly equivalent in sweetness to 1.5% sugar.

| | |
|---|---|
| Spray dried milk powder | 9.5 |
| Sugar | 13.5 |
| Maltodextrin 40 DE* (Glucose syrup) | 1.7 |
| Palm oil | 9.5 |
| Monoglyceride from palm oil | 0.5 |
| Glycerol | 3.0 |
| Salt | 0.05 |
| Flavour and colour | 0.1 |
| Stabilisers | Table 1** |
| Water to | 100 |

*DE = dextrose equivalent
**The SCMC used was powder B600 supplied by ICI Limited.

The log C values at −20° C of Examples 3 to 14 and Comparisons A to F were in the range 2.5 and 2.9 and averaged 2.7. The log C of the standard ice cream mentioned above was in the range 3.2 to 3.3.

TEST METHODS

Melt-Down Test and Shape Retention

A rectangular block of ice cream of length 13.6 cm, height 4.0 cm and width about 8.8 cm which has been stored at −20° C is placed on a wire gauze (10 wires per inch) in an atmosphere maintained at 15° C. Arrangements are made for collection of the liquid drained from the gauze. The time for the collection of the first 10 ml of liquid is noted. The volume of liquid collected in each subsequent 10 minute period is measured and the slope of the graph obtained by plotting volume collected against time is taken as the melt-down (mls/hr). After 4 hours thawing photographs of the residue of the brick are taken, and the degree of shape retention assessed as bad, poor, fair, good or very good.

Stability to Temperature Cycling

This was carried out on an approximately cuboid ½ gallon block of ice cream in a plastic container. After storage in a deep-freeze it was transferred to ambient (20° C) for 1½ hours and then to a refrigerator at −10° C. Next day the block was subjected to further temperature shock cycling by being taken out of the refrigerator and left at ambient for ½ hour. This (each day ½ hour at ambient) was repeated to a total of six times and then the block was returned to the deep-freeze for assessment the next day. The total test took, allowing for a weekend, not more than ten days. Product stability was assessed as follows:

Bad: total breakdown
Poor: 20 of product converted to serum
Fair: 5 – 20% of product converted to serum
Good: 5% of product converted to serum

C and Log C

To determine C and hence log C the following method is used:

Principle

The hardness of ice cream is measured by allowing a standard cone to penetrate a sample for 15 seconds using a cone penetrometer. The C-value can be calculated from the penetration depth.

Apparatus

Ebonite Cone

With an apex angle of 40°±10° and the tip blunted by a few strokes on fine abrasive paper to give a flat 0.3 ±0.03 mm in diameter. Total weight of cone and sliding penetrometer shaft 80 ±0.3 g.; also additional weights of 80 ±0.3g.

Penetrometer

With a scale calibrated in 0.1 mm., and fitted with a lens. The penetrometer made by Sommer and Runge, Berlin, is recommended, particularly for static use. The Hutchinson instrument can also be used; it requires no electricity supply, but must be modified for satisfactory operation. The accuracy of penetrometer timing mechanisms must be checked regularly. The use of a ×3 magnification lens of about 6–8 cm. diameter fitted to the penetrometer facilitates the setting of the cone tip on the sample surface, and an unfocused light limited to the equivalent of a 1-watt bulb at a distance of about 5 cm. (to avoid heating the sample surface) is also advantageous.

Temperature Probe

Reading to within 0.1° C. The temperature probe should have a stem about 1 mm. in diameter and about 4 cm. long. Its accuracy should be checked regularly in baths of known temperatures.

Tempering Facilities a. Room controlled at required temperature ± 1° C;
b. Constant-temperature cabinets, tolerance ± 0.2° C.

The forced-draught constant-temperature cabinets supplied by Zero N.V. Rotterdam are satisfactory.

Process

Sampling

Samples should be convenient size and preferably with smooth surfaces to increase accuracy.

Tempering

2 Days at whatever temperature is required e.g. −20° C. Measure temperature accurately before penetration.

Measurement

Where possible, penetrations are made in the temperature-controlled room, and should be completed within 2 minutes of removing the sample from the constant-temperature cabinet.

1. Insert the temperature probe as near horizontally as possible at a few mm. below the sample surface, read and note the sample temperature after 30 seconds.

(Reject any samples differing by more than 0.5° C from the nominal test temperature.)

2. Place the samples on the levelled penetrometer table.

3. Set the cone tip accurately on the sample surface, using a lens and, if necessary, oblique lighting.

4. Release the arresting device and allow the cone to penetrate the sample for 15 seconds.

5. Read and note the penetration depth.

6. Should the penetration depth be less than 72 × 0.1 mm. (equivalent to a C-value of more than 500 g./cm$^2$) the measurement should be repeated with the cone weight increased by 80 g. Further 80 g. weights may be added as necessary to ensure adequate penetration of the sample and the C-value scale reading corrected accordingly.

7. Penetration measurements should not be made within 2 cm. of the sample edge nor within 2.5 cm. of each other. Determinations in which air bubbles, cracks, etc. interfere should be rejected.

Calculation of C-values

The C-value can be calculated from the penetration depth using the formula:

$$C = K \times F/_{p}1.6$$

where $C$ = Yield value or C-value (g./cm.$^2$)
$F$ = Total weight of cone and sliding stem (g.)*
$P$ = Penetration depth (0.1 mm.)
$K$ = Factor depending on cone angle:

| Cone angle° | K value |
|---|---|
| 30 | 9670 |
| 40 | 5840 |
| 60 | 2815 |
| 90 | 1040 |

*Depending on the likely softness of the product, the cone weight should be adjusted, e.g.

| | |
|---|---|
| at −10° C | use 80 gm |
| at −15° C | use 160 gm |
| at −20° C | use 240 gm |

i.e. it depends on temperature of measurement.

C values will usually be taken after hardening conventionally, as for instance described on page 4, lines 18 to 20, and in the standard text-books.

It should be noted that an ice cream according to the invention preferably has a melt-down, determined as described above, of less than 25 ml/hr and particularly preferably of between 5 and 20 ml/hr.

It should further be noted that the log C at −20° C of an ice cream according to the invention should preferably not be less than 2.3.

Further details of suitable microcrystalline celluloses are available in pamphlets obtainable from FMC Corporation, Avicel Department, Marcus Hook, Pa. 19061 for instance in Bulletin RC-16 and pamphlets RC-30 and RC-34. RC-30 describes use of microcrystalline cellulose in frozen desserts and states, inter alia, that "It is compatible with all stabilising systems except those containing Guar, Locust Bean, and Na Alginate."

TABLE I

| Example or Comparison | Stabilisers % by wt Avicel RC 591* | LBG | Guar Gum | Tara Gum | SCMC | Mix Viscosity (cps) | Over-run % | Meltdown at +15° 1st 10 ml (mins) | Rate (mls/hr) | Shape Retention | Stability Cycling | Overall Acceptability |
|---|---|---|---|---|---|---|---|---|---|---|---|---|
| A | 0.2 | | | | | 13 | 45 | 40 | 134 | Bad | Bad | Totally unacceptable |
| B | | 0.175 | | | | 44 | 95 | 80 | 26 | Poor | Poor | Totally unacceptable |
| C | | | | | 0.15 | 27 | 143 | 135 | 20 | Poor | Fair | Totally unacceptable |
| D | | 0.175 | | | 0.15 | 128 | 147 | >240 | <3 | Fair | Fair | Unacceptable** |
| E | | | 0.175 | | 0.15 | 115 | 163 | >240 | <3 | Poor | Fair | Unacceptable** |
| F | | | | 0.175 | 0.15 | 134 | 140 | >240 | <3 | Fair | Fair | Unacceptable** |
| 3 | 0.2 | 0.175 | | | | 45 | 132 | 110 | 14 | Good | Fair | Acceptable |
| 4 | 0.2 | | | | 0.15 | 46 | 130 | 145 | 12 | Poor | Good | Just acceptable |
| 5 | 0.2 | 0.175 | | | 0.15 | 94 | 147 | 240 | 3 | Good | Good | Very acceptable |
| 6 | 0.1 | 0.175 | | | 0.05 | 64 | 112 | 65 | 7 | Fair | Fair | Acceptable |
| 7 | 0.2 | 0.175 | | | | 34 | 152 | 210 | 10 | Fair | Fair | Just acceptable |
| 8 | 0.2 | | | 0.175 | | 49 | 129 | 160 | 18 | Good | Fair | Acceptable |
| 9 | 0.2 | | 0.175 | | 0.15 | 92 | 160 | >240 | <3 | Good | Good | Very acceptable |
| 10 | 0.2 | | | 0.175 | 0.15 | 104 | 144 | >240 | <3 | V.Good | Good | Very acceptable |
| 11 | 0.1 | 0.175 | | | 0.15 | 110 | 110 | >240 | <3 | Fair | Fair | Acceptable |
| 12 | 0.05 | 0.175 | | | 0.15 | 102 | 125 | >240 | <3 | Fair[1] | Fair[1] | Acceptable[1] |
| 13 | 0.2 | 0.1 | | | 0.15 | — | 120 | >240 | <3 | Good | Good | Acceptable |
| 14 | 0.2 | 0.05 | | | 0.15 | 57 | 130 | >240 | <3 | Good[2] | Fair | Acceptable[2] |

*Contains 11% by weight SCMC.
**A major contributing factor was the poor organoleptic properties; the products were too gummy. The presence of microcrystalline cellulose reduces this effect to a surprising extent; this is general. It was also noted that an excessively high mix viscosity gave some indication that the product would have poor organoleptic properties, particularly in the absence of microcrystalline cellulose.
[1]Worse than 11
[2]Worse than 13

What is claimed is:

1. A conventional ice cream which is spoonable at −20° C. and stable at eating temperatures comprising (a) a sufficient amount of freezing point depressants such that the log C, where C is the penetrometer value of the ice cream, at −20° C. is less than 2.8 and (b) 0.15 to 1.0% by weight of a stabilizer system consisting essentially of (i) microcrystalline cellulose in an amount of 0.1 to 0.8% by weight of the ice cream and (ii) carboxymethyl cellulose, with or without a galactomannan gum, the weight ratio of (i) to (ii) being in the range 4:1 to 1:4, and, in the absence of a galactomannan gum, the weight ratio of microcrystalline cellulose to carboxymethyl cellulose being not greater than 3:1.

2. An ice cream as claimed in claim 1 wherein the stabilizer system consists essentially of microcrystalline cellulose, carboxymethyl cellulose and locust bean gum.

3. An ice cream as claimed in claim 1 wherein the stabilizer system consists essentially of microcrystalline cellulose, carboxymethyl cellulose and tara gum.

4. An ice cream as claimed in claim 1 wherein a sufficient amount of freezing point depressants is used such that the log C for the ice cream at −20° C. is less than 2.5.

* * * * *